M. KORKUS.
RECEPTACLE LOCK.
APPLICATION FILED JAN. 13, 1919.

1,312,854.

Patented Aug. 12, 1919.
6 SHEETS—SHEET 3.

Inventor
M. Korkus

By A. M. Wilson
Attorney

M. KORKUS.
RECEPTACLE LOCK.
APPLICATION FILED JAN. 13, 1919.
1,312,854.
Patented Aug. 12, 1919.
6 SHEETS—SHEET 4.
FIG. 4.
FIG. 5.
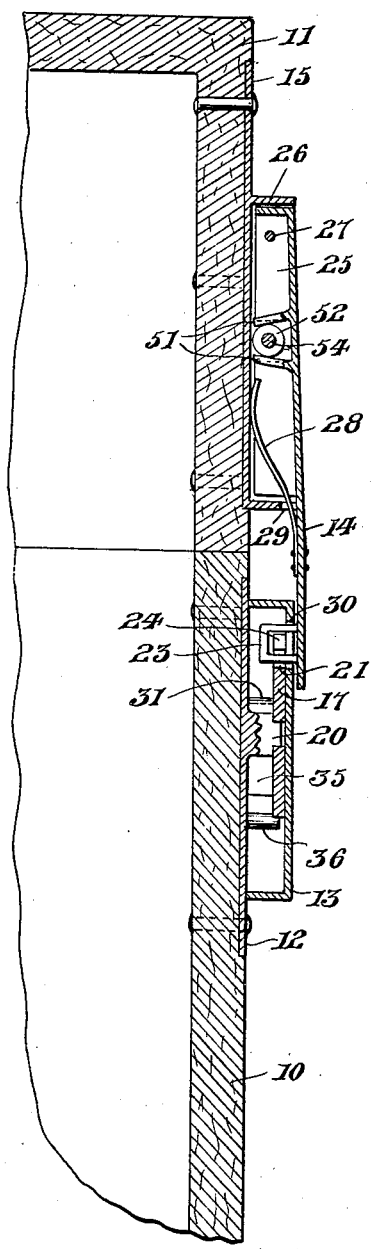
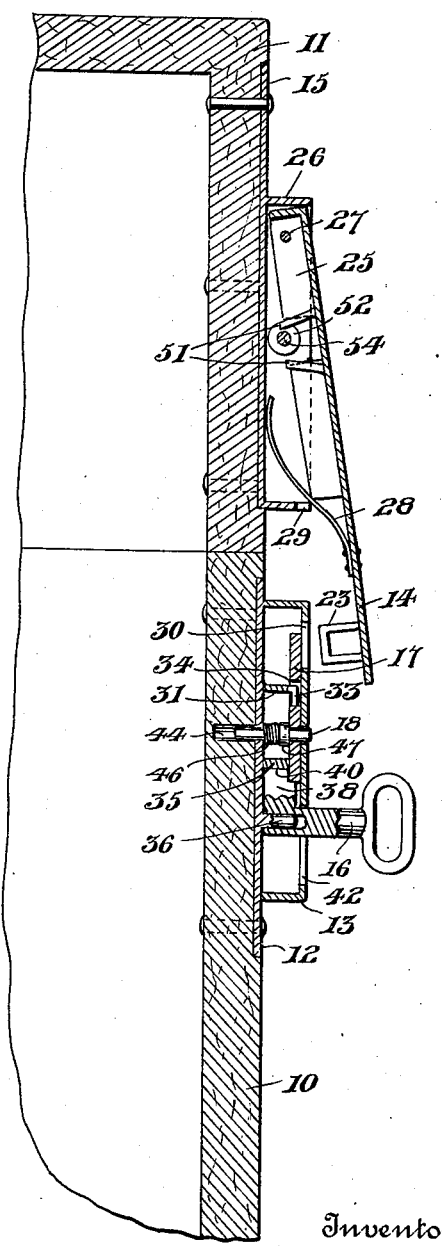

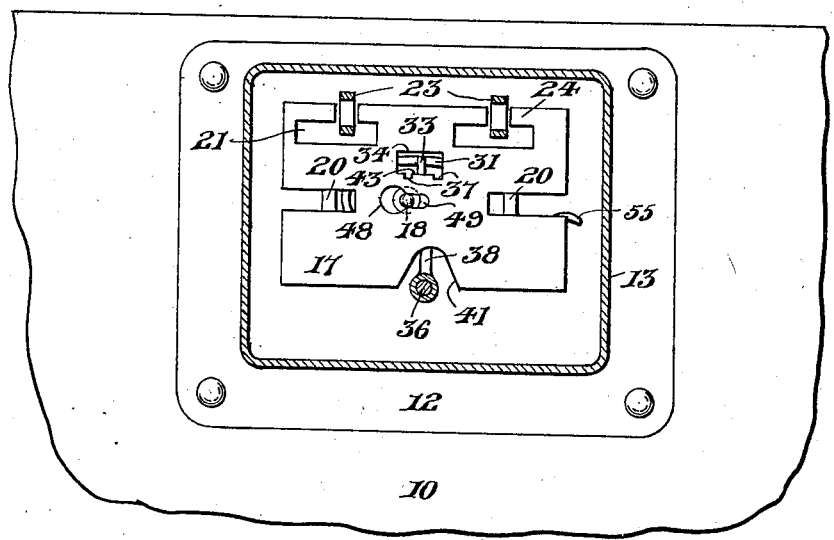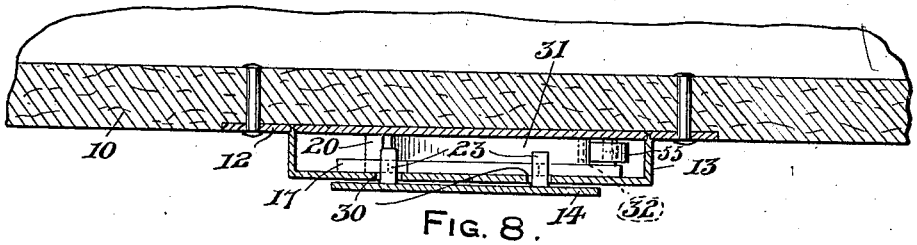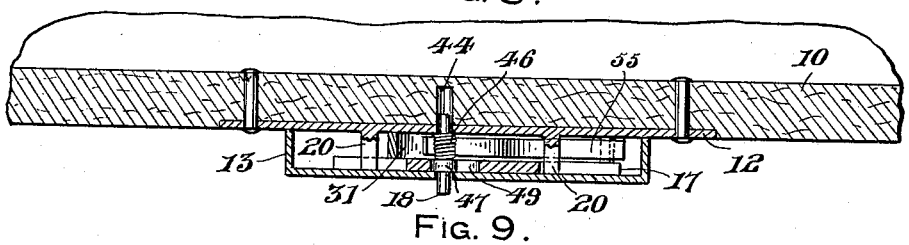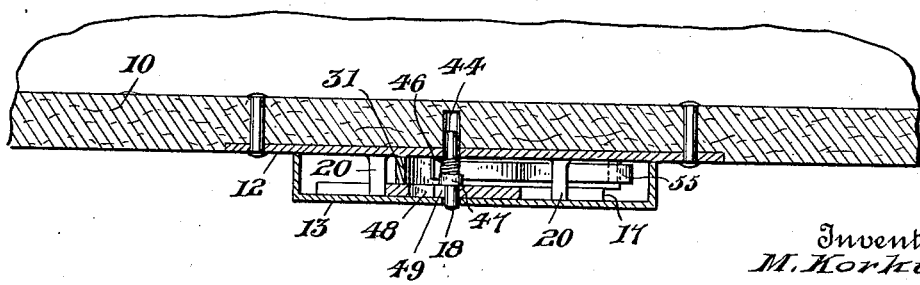

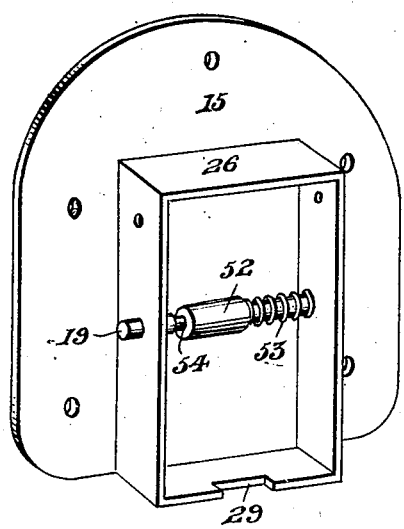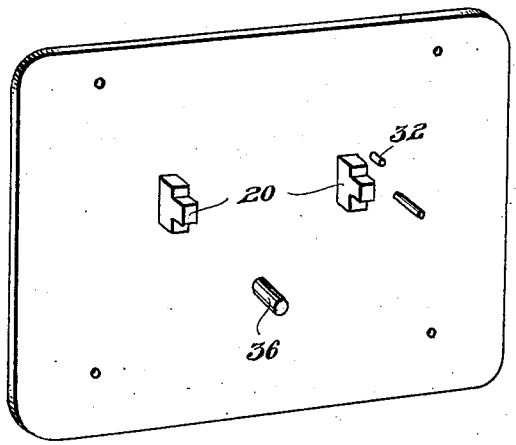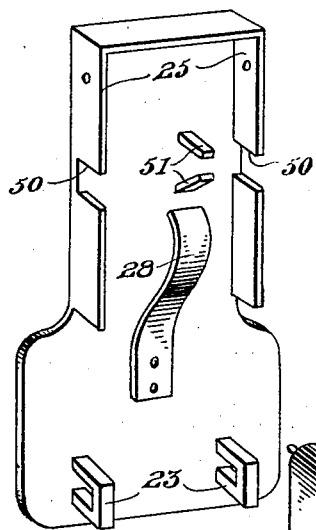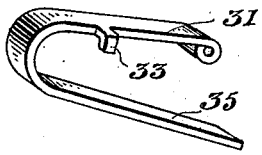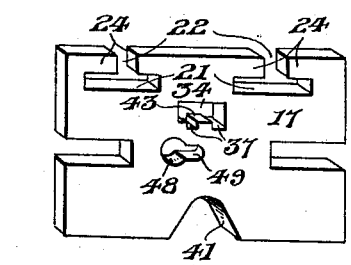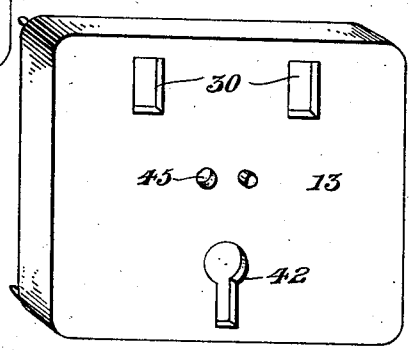

UNITED STATES PATENT OFFICE.

MACIEJ KORKUS, OF PROVIDENCE, RHODE ISLAND.

RECEPTACLE-LOCK.

1,312,854.  Specification of Letters Patent.  Patented Aug. 12, 1919.

Application filed January 13, 1919. Serial No. 270,949.

*To all whom it may concern:*

Be it known that I, MACIEJ KORKUS, a citizen of Russia, residing at Providence, in the county of Providence and State of Rhode Island, have invented certain new and useful Improvements in Receptacle-Locks, of which the following is a specification.

The primary object of the invention is the provision of a lock for the lids of receptacles such as trunks and boxes provided with safety means whereby a person unfamiliar with the operation of the lock will be unable to operate the same, even when in possession of the proper key for the lock.

A further object of the invention is to provide a safety lock especially adapted for trunks in which the proper key for the lock will be incapable of shifting the bolt until a safety device has been manipulated, an additional safety means being also provided for the hasp preventing the opening of the lid when the bolt is retracted, prior to the release of the safety means for the hasp.

A still further object of the invention is to provide a trunk locking means employing a hasp having a secret retaining means, the hasp being associated with the key-operated bolt mechanism upon the trunk, the bolt mechanism also having a secret retainer necessary for release prior to the release of the bolt by the key thereof.

With these general objects in view, the invention consists of the novel combination and arrangement of parts hereinafter fully described in connection with the accompanying drawings.

In the drawings, like reference characters designate corresponding parts throughout the several views, and Figure 1 is a front elevation of a portion of a trunk with the lid closed provided with my invention illustrated in its securing position.

Fig. 4 is a vertical sectional view taken upon line IV—IV of Fig. 1.

Fig. 5 is a view similar to Fig. 4 with all of the mechanism unlocked.

Fig. 6 is a sectional view of the bolt lock released.

Figs. 7 and 8 are horizontal sectional views taken upon lines VII—VII and VIII—VIII, respectively of Fig. 3.

Fig. 9 is a similar sectional view taken upon line IX—IX of Fig. 2.

Fig. 10 is a perspective view of the hasp holding and hinging means with the hasp removed.

Fig. 11 is a perspective view of the inner side of the hasp with the safety latch removed.

Fig. 12 is a perspective view of the base plate for the bolt lock.

Fig. 13 is a perspective view of the spring employed with the bolt.

Fig. 14 is a perspective view of the bolt, and

Fig. 15 is a perspective view of the casing for the bolt lock.

Figure 1:
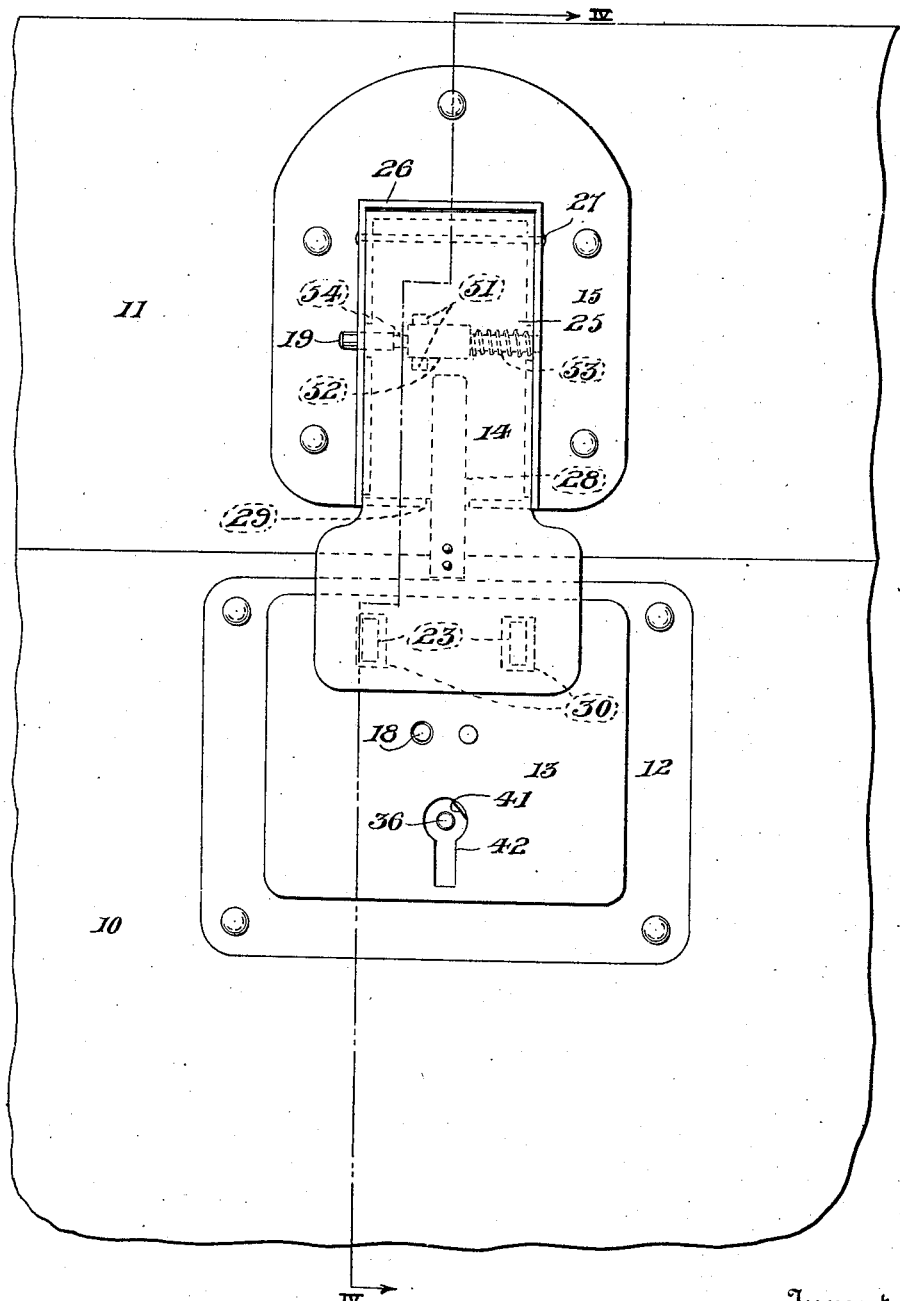

It being understood that the invention is especially designed for employment with box and trunk lids, the same is herein illustrated operatively mounted upon a trunk 10 having a lid 11 of substantially the usual form. A bolt lock having a base plate 12 and a casing 13 thereon for containing the lock mechanism is secured to the side of the trunk 10 while a hasp 14 hinged to a plate 15 secured to the lid 11 is operatively associated therewith so that when the hasp 14 is secured by the lock mechanism, the lid 11 cannot be opened.

Figure 2:
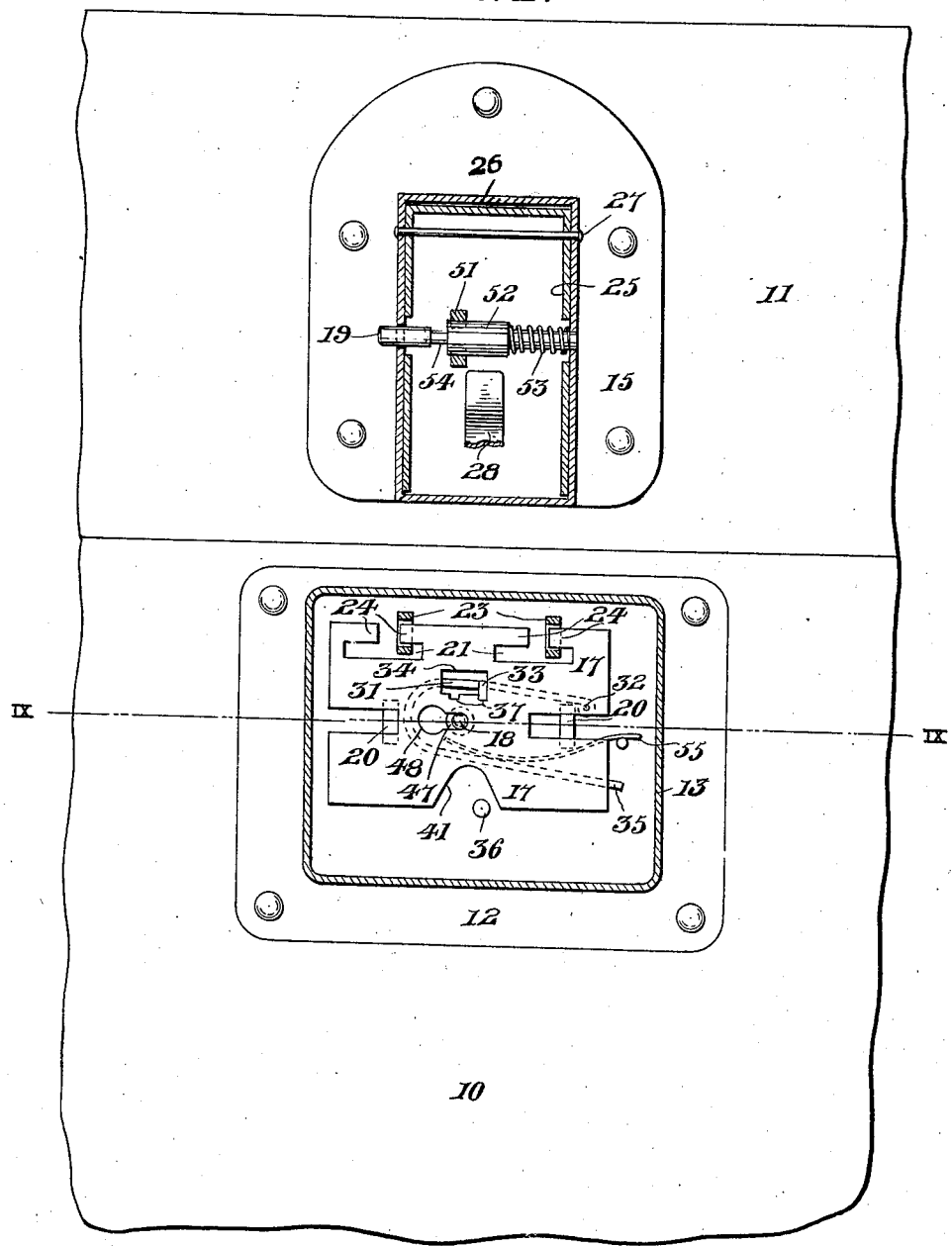
Fig. 2 is a vertical sectional view through the invention taken in a plane parallel to the front side of the trunk, the members being locked excepting the safety catch for the bolt which is in its released position.
Figure 3:
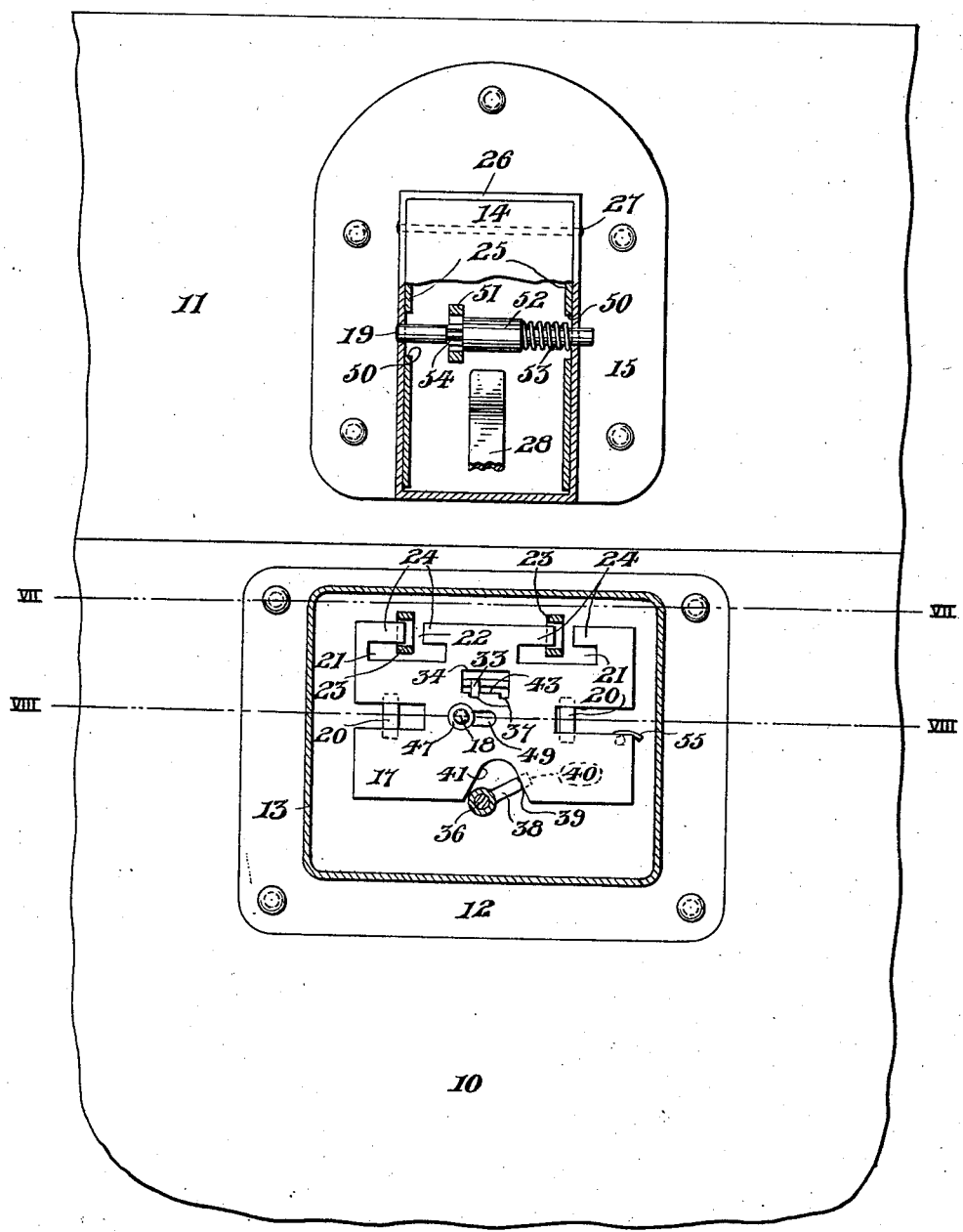
Fig. 3 is a view similar to Fig. 2 with the safety means for the hasp released and the safety catch for the bolt in its securing position.

A key 16 is provided for actuating the sliding bolt 17 within the casing 13 but the said bolt cannot be shifted by the key when the safety catch 18 is in its engaging position. Moreover, the hasp 14 will still retain the lid 11 closed although the bolt 17 is disengaged from the hasp until after the safety latch 19 of the hasp has been manually released. The bolt 17 is slidably mounted upon posts 20 carried by the base plate 12 and has T-shaped slots 21 adjacent one end thereof with the entrance portions 22 of said slots adapted to receive U-shaped keepers 23 upon the inner face of the hasp 14 when the bolt 17 is in its released position as illustrated in Fig. 6 of the drawings. At such times, the hasp 14 is disconnected from the lock mechanism of the trunk 10 and upon shifting the bolt 17 in either direction, the portions 24 of the bolt at opposite sides of the entrances 22 engage within the keepers 23 thereby securing the hasp in its locked position as illustrated in Figs. 2 and 3 of the drawings.

The hasp 14 has a U-shaped flange 25 positioned within a rectangular frame 26 upon the plate 15 of the lid 11, a pin 27 being extended through the flange 25 and frame 26 for pivoting the hasp to the plate 15. A leaf spring 28 secured to the underface of the hasp projects through a slot 29 in the lower wall of the frame 26 and bears against the plate 15 for automatically removing the keepers 23 from the receiving openings 30 of the lock casing 13 when the bolt 17 is in its retracted released position.

A U-shaped spring 31 is pivoted as at 32 upon the plate 12 beneath the bolt 17 and has an L-shaped lug 33 extending into a substantially central slot 34 of the bolt 17. The free end 35 of the spring 31 depends to a point adjacent the key post 36 provided upon the base plate 12 and when the bolt 17 is in its locked position at either extremity of its movement, the lug 33 is seated in one of the bottom notches 37 of the slot 34.

The key 16 has its bit 38 notched as at 39 so that the free end 40 of the bit engages the end 35 and tilts the spring 31 upwardly on its pivot 32 when the bit engages the sides of the cutaway portion 41 of the bolt 17 when turning for shifting the bolt. It will be seen that upon positioning the key 16 upon the key post 36 by inserting the key through the slot 42 of the casing 13, when the mechanism is positioned as illustrated in Fig. 3, the end 40 of the key bit 38 will lift the lug 33 out of its notch 37 permitting the bit 38 to slide the bolt 17 to the released position shown in Fig. 6 of the drawings and at which time the lug 33 will be seated upon the bottom edge 43 of the slot 34 between the notches 37. The keepers 23 are then free to be removed through the casing opening 30. Upon a further turning of the key 16, the bolt 17 will be shifted for again locking the hasp by engaging the keepers 23 and the lug 33 will automatically seat into the opposite notch 37 of the slot 34. When locked in this position, the reverse movement of the key 16 will shift the bolt 17 to its released position and by a further movement will again relock the bolt mechanism.

The safety catch 18 for the bolt mechanism is in the form of a pin longitudinally slidably positioned in a socket 44 of the trunk 10 and projecting through a perforation 45 in the casing 13. A spring 46 upon the safety catch pin 18 normally maintains an annular enlargement or shoulder 47 thereof in the enlarged portion 48 of a keyhole-shaped slot provided through the bolt 17 adjacent the slot 34 thereof. When the shoulder 47 is within said slot portion 48, the bolt 17 is prevented from any longitudinal movement but upon depressing the pin 18 by exerting pressure thereon from a point outwardly of the casing 13, the pin 18 is depressed and the shoulder 47 positioned beneath the bolt 17 so that the narrow portion 49 will freely receive the pin 18, thereby permitting the free sliding movement of the bolt 17. The bolt 17 moreover, may be released from the keepers 23 when the safety catch 18 is maintained depressed when the bolt is at the left hand extremity of its movement in locking position as shown in Fig. 2 of the drawings so that the bolt at such times may be retracted to its unlocked position as shown in Fig. 6 without the necessity of depressing the safety catch 18 herein described.

The safety latch 19 for the hasp 14 is in the form of a shaft slidably journaled through the frame 26, side notches 50 being provided in the flange 25 for accommodating the same. Converging guide arms 51 are mounted upon the inner face of the hasp 14 between which arms, an enlarged barrel portion 52 of the safety latch 19 is normally positioned when the hasp 14 is closed. A spring 53 encircles the safety latch shaft 19 and bears against the barrel portion 52 thereof for normally maintaining said portion between said arms 51. An outwardly projecting end of the shaft 19 at one side of the frame 26 may be pressed inwardly, however, for forcing the barrel portion 52 through the arms 51 with a reduced portion 54 of the shaft 19 between said arms, which being of lesser diameter, permits the hasp 14 to swing outwardly upon its pivot 27 under the influence of the spring 28.

When the hasp 14 is closed with the keepers 23 within the casing openings 13 of the bolt lock, the hasp cannot be released from the trunk 10 nor the keepers 23 removed from the casing 13 until the safety latch 19 has been manually pushed inwardly for releasing the barrel portion 52 from the arms 51.

The complete operation of the invention will be fully understood from this detailed description thereof, the movements of the bolt 17 to and from its released and locking positions have been noted as well as the function of the safety catch 18 in preventing the bolt 17 from being released. A person familiar with the construction of the lock will hold the safety catch 18 released while unlocking the bolt 17 by means of the key 16 and will then depress the safety latch 19, permitting the hasp 14 to automatically swing outwardly clear of the lock casing 13 as shown in Fig. 5 of the drawings. Upon again closing the lid 11, the hasp 14 is depressed positioning the keepers 23 through the casing openings 30 and the safety latch 19 is automatically engaged with the arms 51 of the hasp by means of the spring 53. The hasp is by this means locked so that the lid 11 cannot be opened but for the final locking of the receptacle, the key 16 is turned for projecting the bolt 17 to the position shown in Fig. 3 of the drawings for engaging the portions 24 with the keepers 23 and the shoulder 47 automatically seats within the enlarged slot portion 48 by means of its spring 46 and the lug 33 seats within the corresponding notch 37 so that the hasp is doubly locked and the bolt 17 is retained by the safety catch 18.

A positioning spring 55 is also provided for the spring 31 in constant engagement with the end portion 35 thereof, said spring 55 normally maintaining the lug 33 in engagement with the edge portions of the slot 34 contacted thereby.

It will be seen that by the employment of my invention, all auxiliary snaps or fastening means ordinarily used with trunk lids are unnecessary as the closing of the lid and the forcing inwardly of the hasp 14 engages the keepers 23 within the casing openings 30 forming a retaining latch for the lid until the bolt 17 of the lock has been operated.

What I claim as new is:—

1. A closure retainer for receptacles comprising a key-operated bolt lock upon the receptacle, a swinging hasp upon the lid of the receptacle operatively associated with said lock, and a safety latch for the hasp adapted for retaining the hasp depressed, said safety latch being carried by the hasp support and transversely slidable relative to said hasp and support adapted for engagement with said hasp intermediate its ends when at the limit of movement in one direction.

2. A device of the class described comprising in combination with a receptacle having a lid, a bolt lock upon the receptacle provided with a casing having keeper openings, a hasp swingingly mounted upon the lid having keepers adapted to project in said openings when the hasp is depressed and releasable means for the hasp adapted for retaining the latter in its depressed position, said means being carried by the hasp support and transversely slidable relative to said hasp and support adapted for engagement with said hasp intermediate its ends when at the limit of movement in one direction.

3. A device of the class described comprising in combination with a receptacle having a lid, a bolt lock upon the receptacle provided with a casing having keeper openings, a hasp swingingly mounted upon the lid having keepers adapted to project in said openings when the hasp is depressed, releasable means for the hasp adapted for retaining the latter in its depressed position, said means being carried by the hasp support and transversely slidable relative to said hasp and support adapted for engagement with said hasp intermediate its ends when at the limit of movement in one direction, and a safety catch for said lock adapted for preventing the operation thereof when desired.

4. In combination with a receptacle having a lid, a lock casing upon the receptacle having openings therein, a key-operated slide bolt within the casing, a safety catch for the bolt extending from the bolt at all times and projecting from the casing and having an enlargement adapted for normally preventing the shifting of the bolt from its locked position, the said bolt having keeper engaging portions shiftable transversely inwardly of said openings.

5. In combination with a receptacle having a lid, a lock casing upon the receptacle having openings therein, a key-operated slide bolt within the casing, a safety catch for the bolt projecting from the casing adapted for normally preventing the shifting of the bolt from its locked position, the said bolt having keeper engaging portions shiftable transversely inwardly of said openings, a swinging hasp upon the lid, keepers upon the inner face of the hasp adapted for reception through said slots within the path of movement of the bolt when the hasp is depressed, means carried by the hasp adapted for automatically swinging the hasp to its open position and a releasable safety latch carried by the hasp and adapted to engage the lid for normally maintaining the hasp depressed with said keepers within the casing openings.

6. In combination with a receptacle having a lid, a lock casing upon the receptacle having openings therein, a key-operated slide bolt within the casing, a safety catch for the bolt projecting from the casing adapted for normally preventing the shifting of the bolt from its locked position, the said bolt having keeper engaging portions shiftable transversely inwardly of said openings, a frame upon the lid, a hasp having a flange pivotally mounted within said frame, keepers upon the inner face of the hasp adapted for positioning within the casing openings for engagement by the bolt portions when the hasp is depressed, a latch slidably mounted through said frame having an enlarged barrel portion and reduced portion adjacent thereto, converging arms upon the hasp between which arms the said latch is positioned, a spring encircling the latch adapted for automatically positioning the barrel portion thereof between said arms when the hasp is depressed whereby the hasp is prevented from swinging outwardly.

7. A trunk lock comprising a casing having keeper openings therein, a bolt slidably mounted within the casing having keeper engaging portions provided with a path of movement inwardly of said openings, the said bolt having a key-shaped slot therethrough with an enlarged end, a safety catch journaled through the casing having a shoulder portion normally positioned within said enlarged end of the slot when the bolt is at one extremity of its movement in locking position and a spring for the catch adapted for automatically projecting the shoulder portion thereof into said enlarged end of the slot when said enlarged end is brought into registry with said shoulder portion, the outer end of the catch projecting at all times outwardly of the casing.

8. A lock of the type described including a bolt locking mechanism, a hasp associated therewith, a frame for pivotally supporting said hasp, a tensioned sliding bolt having a barrel portion carried by the frame, and inclined fingers carried by the hasp adapted to engage the barrel portion of the tensioned bolt to hold the hasp immovable on its pivot and in the lock.

9. A lock of the type described including a bolt locking mechanism, a hasp associated therewith, a frame for pivotally supporting said hasp, a tensioned sliding bolt having a barrel portion carried by the frame, and inclined fingers carried by the hasp adapted to engage the barrel portion of the tensioned bolt to hold the hasp immovable on its pivot and in the lock said tensioned bolt extending exteriorly of the frame and hasp and being operable from its projecting end.

10. A lock of the type described including a bolt, a hasp associated therewith, said bolt having a key hole slot therein, and a tensioned safety latch extending through said slot and having a barrel portion adapted to fit in the enlarged end of the key-hole slot to prevent movement of the bolt.

In testimony whereof I affix my signature.

MACIEJ KORKUS.

Copies of this patent may be obtained for five cents each, by addressing the "Commissioner of Patents, Washington, D. C."